US008914060B2

(12) United States Patent
Kim et al.

(10) Patent No.: US 8,914,060 B2
(45) Date of Patent: Dec. 16, 2014

(54) PORTABLE TERMINAL

(75) Inventors: Sang-Hun Kim, Seoul (KR); Hyun-Su Lim, Gyeonggi-do (KR); Jea-Moon Jung, Gyeonggi-do (KR); Geun-A Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 319 days.

(21) Appl. No.: 13/050,227

(22) Filed: Mar. 17, 2011

(65) Prior Publication Data

US 2012/0034957 A1 Feb. 9, 2012

(30) Foreign Application Priority Data

Aug. 5, 2010 (KR) .................. 10-2010-0075417

(51) Int. Cl.
*H04M 1/00* (2006.01)
*H01Q 1/08* (2006.01)
*H04M 1/02* (2006.01)
*H01Q 1/24* (2006.01)

(52) U.S. Cl.
CPC ............. *H04M 1/0262* (2013.01); *H01Q 1/084* (2013.01); *H01Q 1/243* (2013.01)
USPC ...................... 455/550.1; 455/572; 455/575.1

(58) Field of Classification Search
USPC .................................... 455/550.1, 571, 575.1
See application file for complete search history.

(56) References Cited

U.S. PATENT DOCUMENTS

| 6,327,154 | B1 * | 12/2001 | Gauld et al. ................... 361/737 |
| 2006/0199606 | A1 * | 9/2006 | Makino ....................... 455/550.1 |
| 2006/0244417 | A1 * | 11/2006 | Tsai et al. ...................... 320/112 |
| 2007/0026107 | A1 * | 2/2007 | Wang et al. ...................... 426/55 |

* cited by examiner

*Primary Examiner* — Justin Lee
(74) *Attorney, Agent, or Firm* — Cha & Reiter, LLC

(57) ABSTRACT

Provided is a portable terminal including a battery opening extending in a longitudinal direction or a widthwise direction of the portable terminal on a rear surface of the portable terminal, a battery pack inserted into the battery opening in the longitudinal direction or the widthwise direction of the portable terminal, and an antenna module pivotably coupled to the rear surface of the portable terminal to open or close the battery opening. The built-in antenna module can pivot, such that the battery pack can be inserted or ejected in the longitudinal direction or the widthwise direction of the portable terminal.

24 Claims, 22 Drawing Sheets

PORTABLE TERMINAL

CLAIM OF PRIORITY

This application claims the benefit under 35 U.S.C. §119 of a Korean Patent Application filed in the Korean Intellectual Property Office on Aug. 5, 2010 and assigned Serial No. 2010-0075417, the entire disclosure of which is hereby incorporated by reference.

BACKGROUND OF THE INVENTION

1. Field of the Invention

The present invention relates to a portable terminal, and more particularly, to an antenna device and a battery pack mounting structure for a portable terminal.

2. Description of the Related Art

Recently, with the popularization of mobile communication terminals, a mobile communication terminal can provide not only a traditional communication function but also an electronic note function, a game or multimedia play function, and simple office work, banking, and shopping functions, and further enable still or moving picture photographing with a camera module mounted thereon.

A portable terminal having a communication function typically includes an antenna device and a battery pack. In consideration of portability, the antenna device is generally shaped to be built in the portable terminal. Miniaturization of the portable terminal can be easily accomplished by a folder-type portable terminal or a sliding-type portable terminal. However, with recent emphasis on the multimedia function of the portable terminal, the demand for a large-size screen is ever increasing. To guarantee a large-size screen and a portability at the same time, a bar-type portable terminal has been gaining its market share as it freely allow both input and output of characters on a touch screen.

FIG. 1 is a perspective view of a typical bar-type portable terminal 10 having a built-in antenna device, and FIG. 2 is a perspective view in which a rear surface of the portable terminal 10 shown in FIG. 1 is partially separated.

As shown in FIGS. 1 and 2, the typical bar-type portable terminal 10 is structured such that a display device 11 having a touch screen function is installed on a front surface, a video communication camera module 19 and a receiving unit (or earpiece) 15 are installed above the display device 11, and a keypad 17 and a transmitting unit 13 (or mouthpiece) are installed below the display device 11. The keypad 17 may be disposed on a side surface of the portable terminal 10 to secure a larger installation region of the display device 11.

An object photographing camera module 29 is installed on the rear surface of the portable terminal 10, and a removable battery pack 23 is provided from the rear surface of the portable terminal 10. After the battery pack 23 is mounted, a cover ember 21 for covering the battery pack 23 may be separately mounted. The object photographing camera module 29 is installed above a mounting region of the battery pack 23, and the cover member 21 may also cover a region where the object photographing camera module 29 is installed. Further, the cover member 23 may have an object photographing opening.

Under the mounting region of the battery pack 23, a built-in antenna device (not shown) and a microphone of the transmitting unit 13 are installed inside the portable terminal 10.

Since the transmitting unit 15, the video communication camera module 19, and the object photographing camera module 29 are installed above the mounting region of the battery pack 23 and the built-in antenna device and the microphone are installed under the mounting region of the battery pack 23, the battery pack 23 has to be mounted/removed while facing the rear surface of the portable terminal 10 as shown in FIG. 2.

Such a battery pack mounting structure exposes a boundary line with the cover member 21 on the rear surface of the portable terminal 10, thus deteriorating the appearance of the portable terminal 10. The rear surface of the portable terminal 10 may be entirely covered with the cover member 21, but in this case, the thickness of the portable terminal 10 would increase. That is, when the cover member 21 also covers the region where the camera module 29 is installed, in spite of minimization of outwardly exposed boundary lines between parts, the thickness of the portable terminal 10 also increases by the thickness of the cover member 21.

SUMMARY OF THE INVENTION

An aspect of the present invention is to address at least the above problems and/or disadvantages and to provide at least the advantages described below. Accordingly, an aspect of the present invention is to provide a portable terminal having a battery pack mounting structure which reduces outwardly exposed boundary lines between parts, thereby allowing more appealing appearance of the portable terminal.

Another aspect of the present invention is to provide a portable terminal having a battery pack mounting structure which contributes to the miniaturization of the portable terminal while making an appearance of the portable terminal elegant.

According to an aspect of the present invention, a portable terminal including a casing having a battery opening extending in a longitudinal direction or a widthwise direction of the portable terminal on a rear surface of the portable terminal, a battery pack inserted into the battery opening in the longitudinal direction or the widthwise direction of the portable terminal, and an antenna module pivotably coupled to the rear surface of the portable terminal to selectively open or close the battery opening.

The portable terminal may further include a receiving recess formed at an end portion or a side end of the rear surface of the portable terminal, in which the antenna module opens or closes the battery opening by being selectively positioned on the receiving recess through pivoting on the rear surface of the portable terminal.

The portable terminal may further include a cover member removably coupled to the rear surface of the portable terminal, wherein the cover member is coupled to the rear surface of the portable terminal while covering the antenna module positioned on the receiving recess.

The antenna module may include a connector connected to an external device through a cable, and in this case, the portable terminal may further include a cover member removably coupled to the rear surface of the portable terminal and a connector opening formed in the cover member, in which the cover member is coupled to the rear surface of the portable terminal while covering the antenna module positioned on the receiving recess, and the connector is exposed to outside through the connector opening.

The portable terminal may further include a rear case installed on the rear surface of the portable terminal and opened at a lower end thereof, in which the battery opening extends from the lower end of the rear case along an inner side of the rear case in a longitudinal direction of the portable terminal.

The portable terminal may further include a receiving recess formed in a lower end portion of the rear surface of the portable terminal as the lower end of the rear case is opened, in which the antenna module opens or closes the battery opening by being selectively positioned on the receiving recess through pivoting on the rear surface of the portable terminal.

The antenna module may open or close the battery opening by pivoting around a hinge axis which extends in parallel with or in perpendicular to the longitudinal direction of the portable terminal.

In the above-structured portable terminal, a built-in antenna generally positioned at an end portion of the portable terminal is pivotably installed, thus allowing the battery pack to be inserted in the longitudinal direction or the widthwise direction of the portable terminal, preferably, in the longitudinal direction of the portable terminal. Therefore, the inlet for inserting the battery pack can be easily positioned at an end portion or a side end of the portable terminal, thus reducing a part boundary line generated by the cover member for protecting the battery pack and making the appearance of the portable terminal elegant. In other words, the part boundary line generated by the cover member for protecting the battery pack can be matched to a boundary line between the front case and the rear case of the portable terminal, thereby removing an unnecessary part boundary line from the exterior of the portable terminal. Moreover, it is not necessary to overlap the cover member with the front and rear cases of the portable terminal, thus contributing to reduction of the thickness of the portable terminal.

BRIEF DESCRIPTION OF THE DRAWINGS

The above and other features and advantages of exemplary embodiments of the present invention will be more apparent from the following detailed description taken in conjunction with the accompanying drawings, in which.

DETAILED DESCRIPTION OF THE INVENTION

Hereinafter, exemplary embodiments of the present invention will be described in detail with reference to the accompanying drawings. A detailed description of known functions and configurations will be omitted when it may unnecessarily obscure the subject matter of the present invention.

Figure 1:
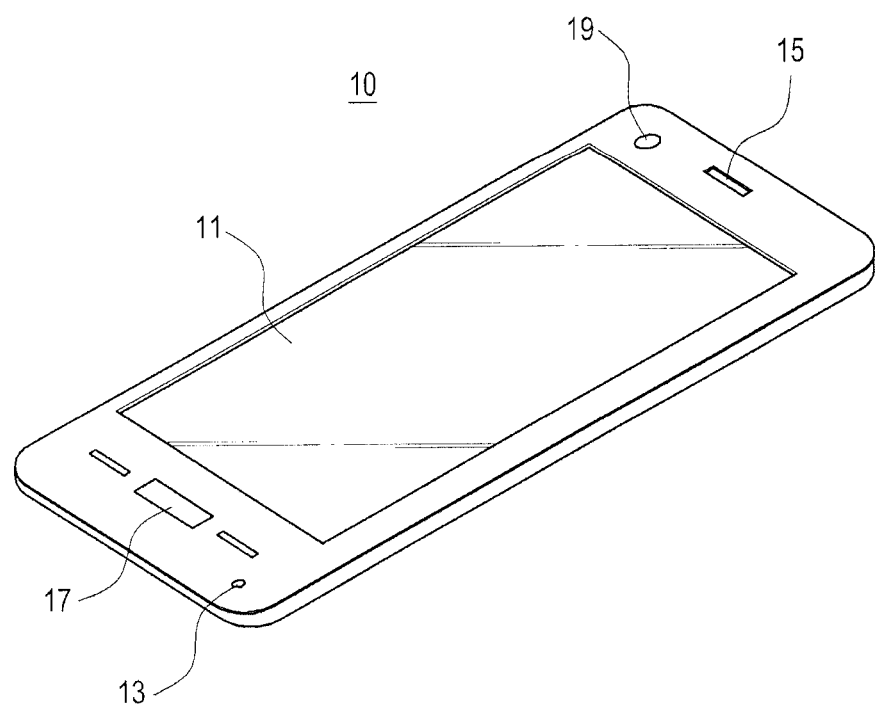
FIG. 1 is a perspective view of a typical portable terminal.
Figure 2:
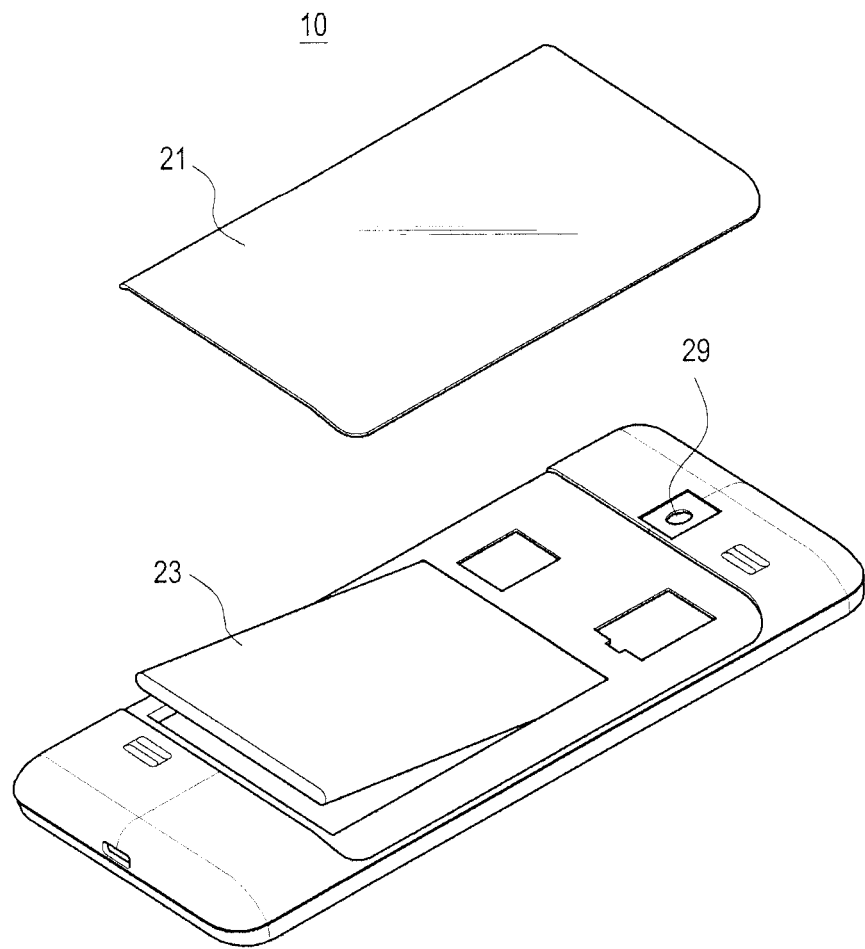
FIG. 2 is an exploded perspective view showing a rear surface of the portable terminal shown in FIG. 1.
Figure 3:
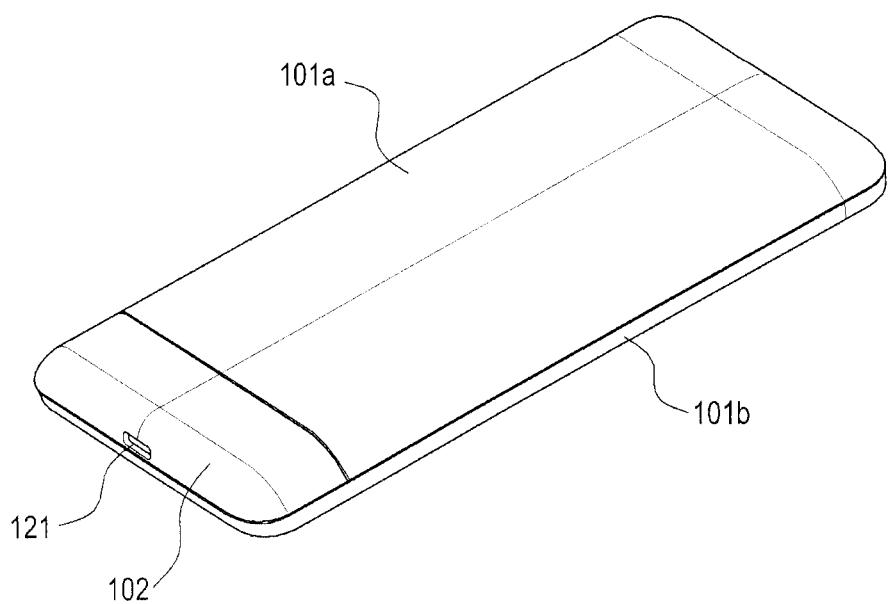
FIG. 3 is a perspective view showing a rear surface of a portable terminal according to a first embodiment of the present invention.
Figure 4:
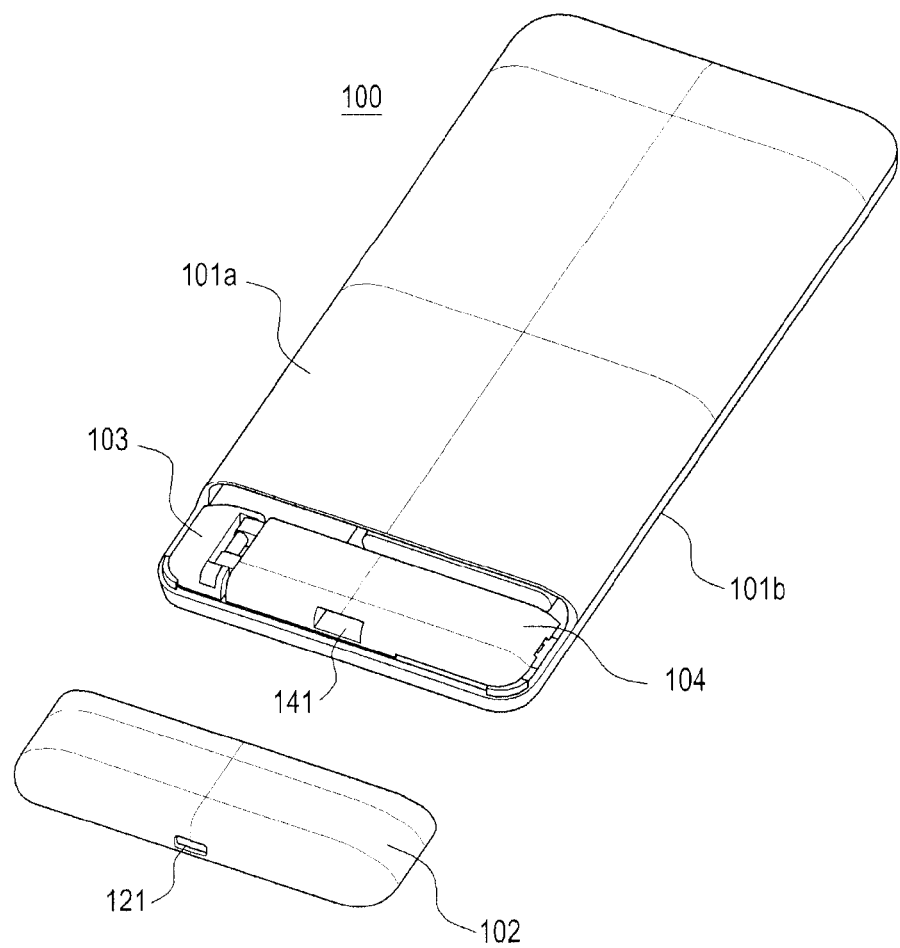
FIGS. 4 through 6 illustrate a sequential process of ejecting a battery pack from the portable terminal shown in FIG. 3.
Figure 5:
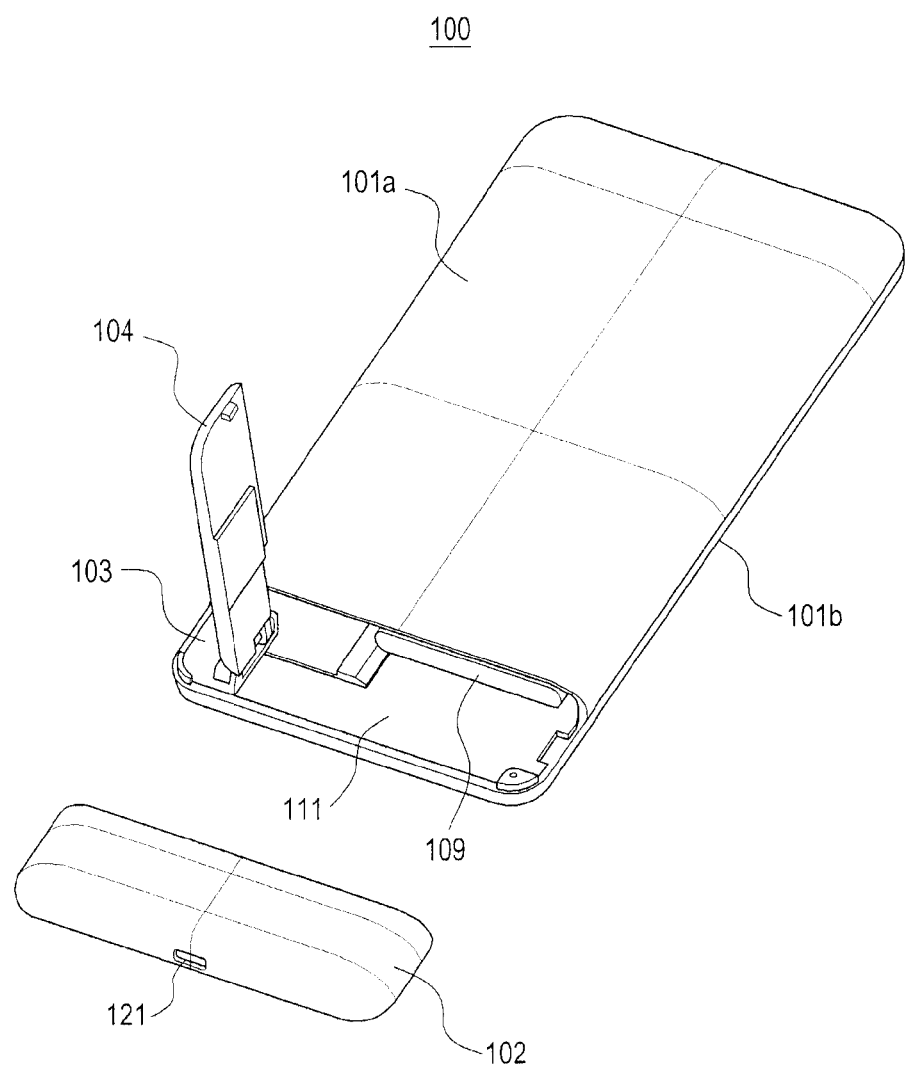
Figure 6:
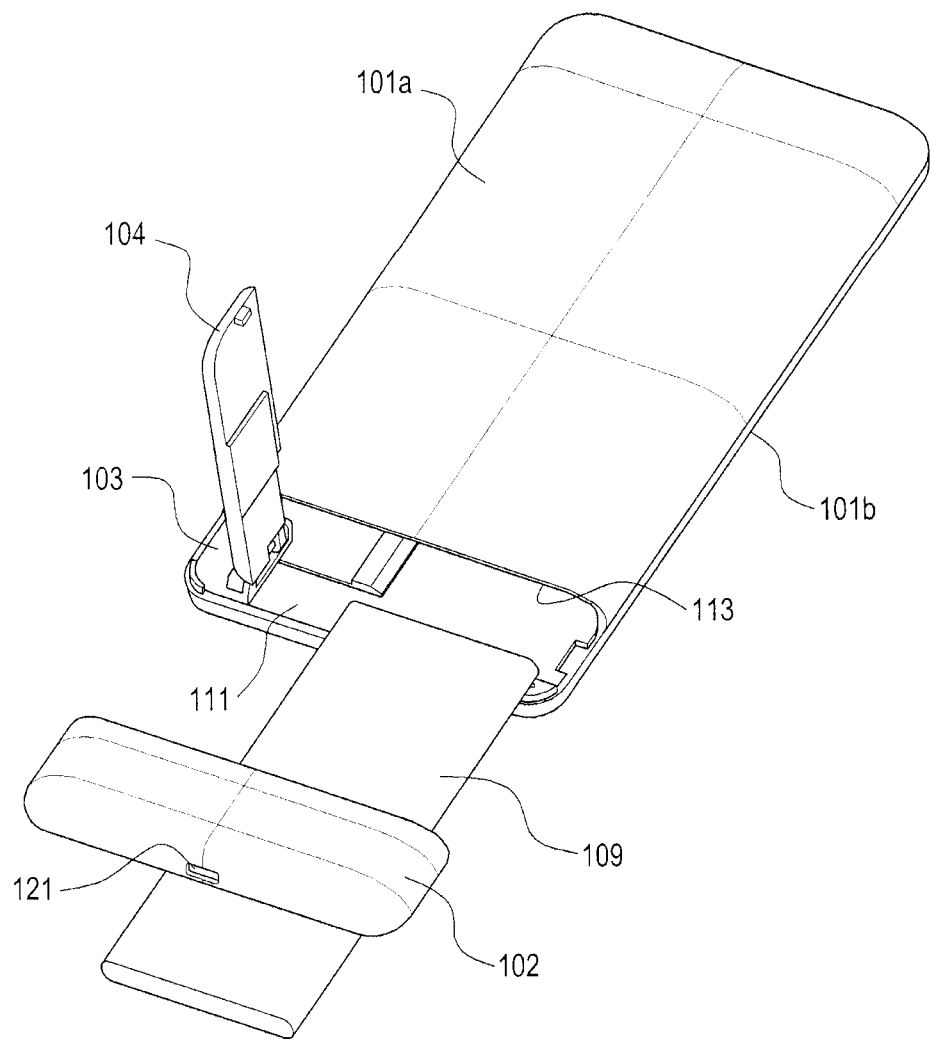
Figure 13:
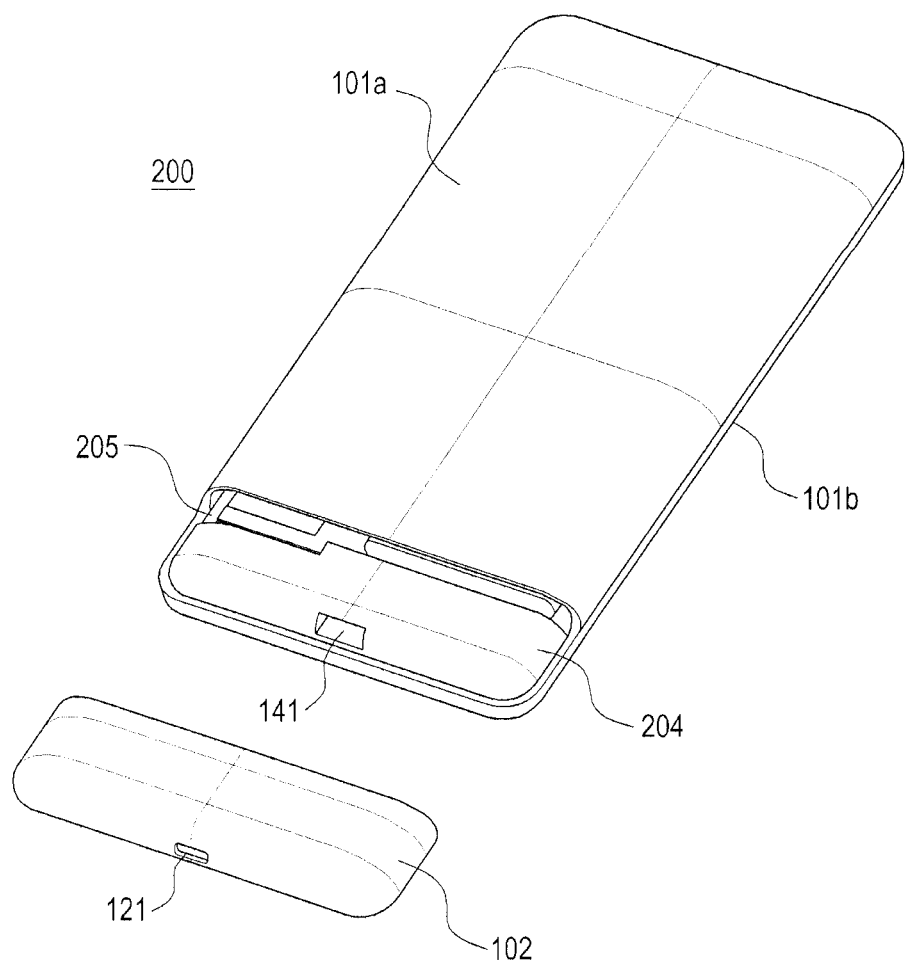
FIGS. 13 through 15 illustrate a sequentially process of ejecting a battery pack from a portable terminal according to a second embodiment of the present invention.
Figure 14:
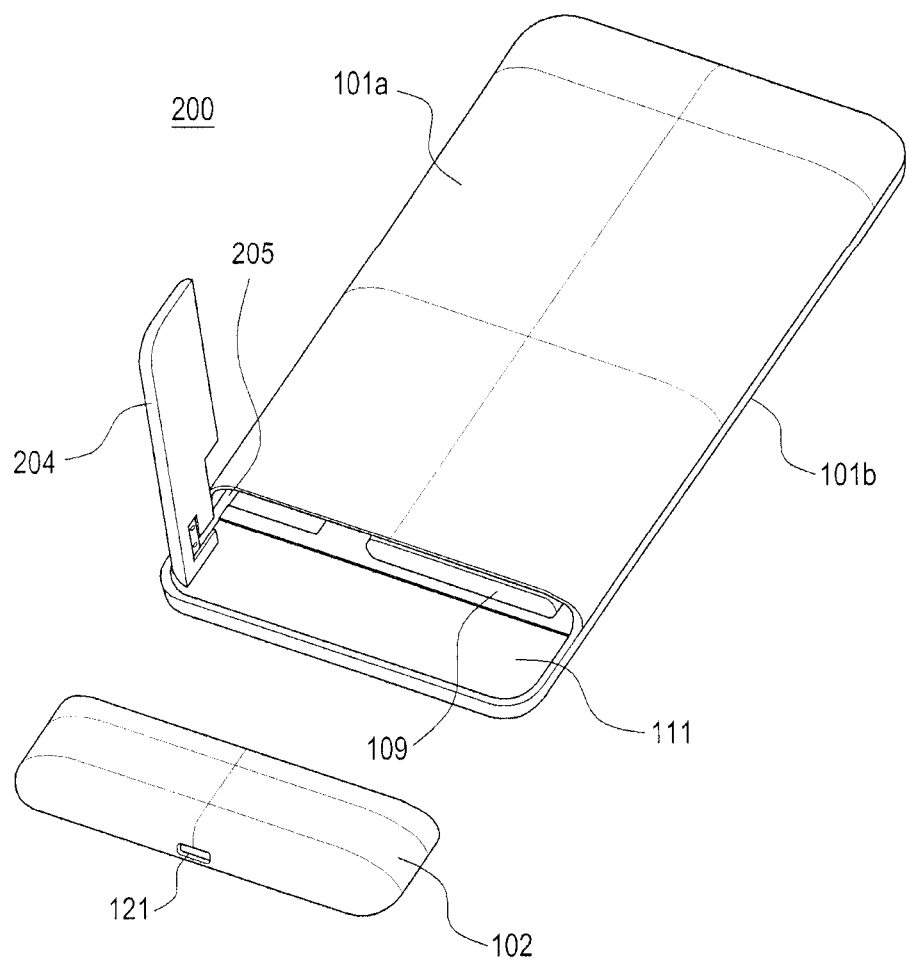
Figure 15:
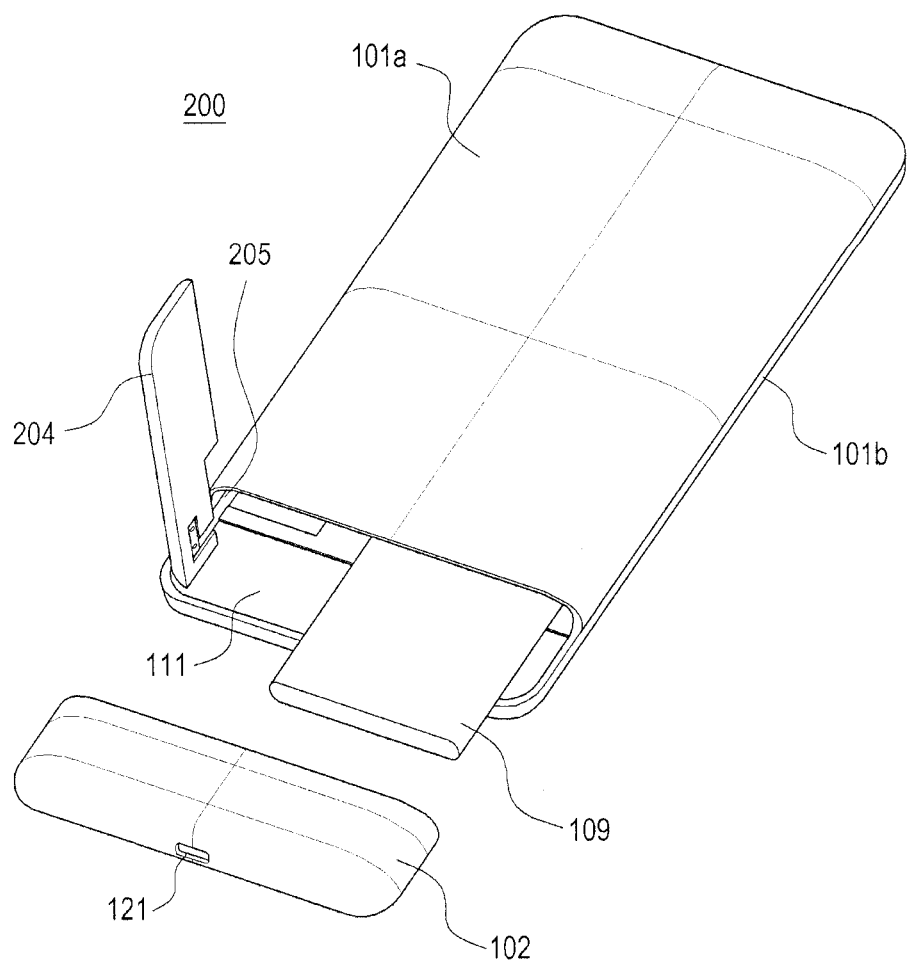
Figure 19:
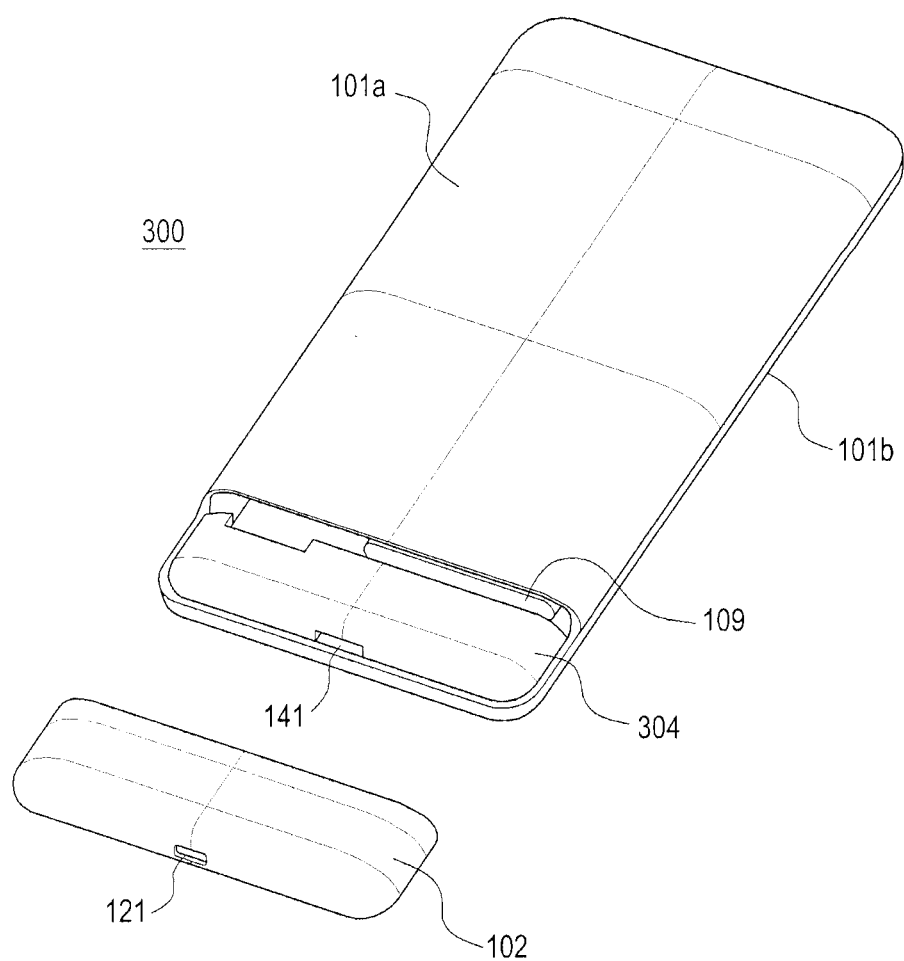
FIG. 19 is a perspective view in which a portion of a portable terminal according to a third embodiment of the present invention is separated.
Figure 21:
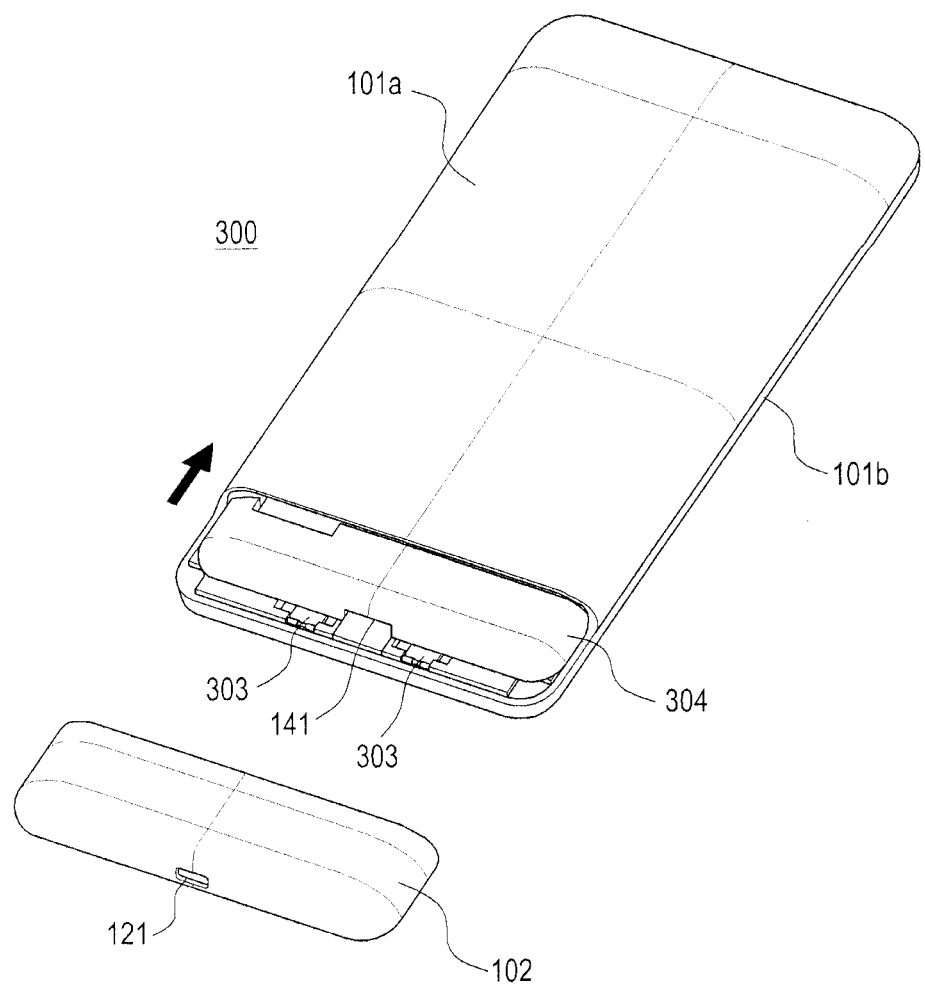
FIG. 21 is a perspective view showing a state where an antenna module of the portable terminal shown in FIG. 19 moves away from a hinge shaft.
Figure 24:
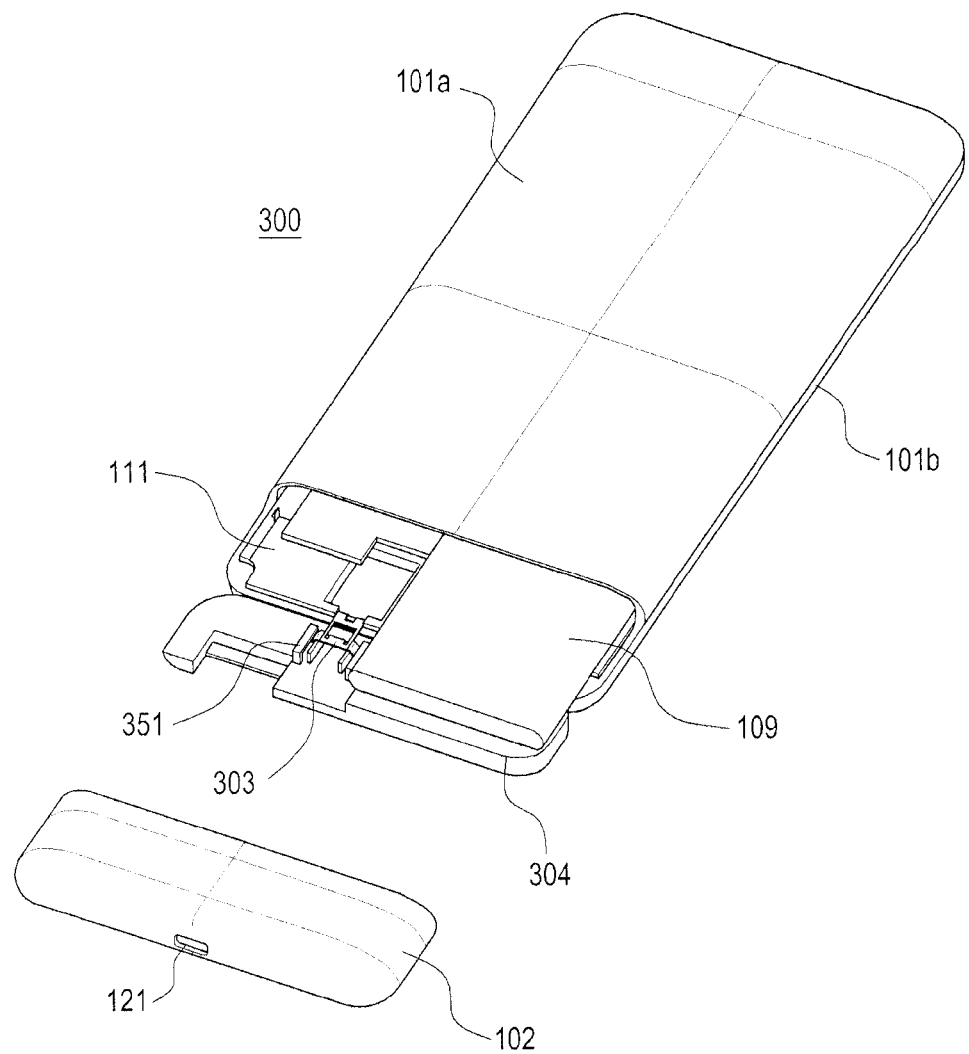
FIG. 24 is a perspective view showing a state where a battery pack is ejected 10 after an antenna module of the portable terminal shown in FIG. 19 opens a battery opening.

FIG. 3 is a perspective view showing a rear surface of a portable terminal 100 according to a first embodiment of the present invention, and FIGS. 4 through 6 illustrate a sequential a process of ejecting a battery pack 109 from the portable terminal 100 shown in FIG. 3. FIGS. 13 through 15 illustrate another process according to a second embodiment of the present invention, and FIGS. 19, 21, and 24 illustrate yet another process according to a third embodiment of the present invention.

In the embodiments of the present invention, portable terminals having three different features are disclosed herein. These embodiments disclose a common structure for inserting a battery pack in a longitudinal direction of a portable terminal. However, it will be easily understood by those of ordinary skill in the art that they are illustrative examples, and that the battery pack may also be inserted in a widthwise direction of the portable terminal according to a modification of the shape of the structure. Further, while the structure is applied to a bar-type terminal in the detailed embodiments of the present invention, the battery pack or an antenna module installation structure of the portable terminal according to the present invention can also be applied to a folder-type terminal, a sliding-type terminal, or a swing-type terminal, and any other type terminal that uses the battery pack.

Referring to FIG. 3, a cover member 102 is coupled to a surface of the portable terminal 100, preferably a rear surface of the portable terminal 100, to complete the exterior of the portable terminal 100. Although not shown, input devices such as a keypad, and a transmitting unit and output devices such as a display device and a receiving unit may be installed on a front surface of the portable terminal 100. Such a structure of the portable terminal 100 corresponds to a bar-type portable terminal, and if the portable terminal 100 is one of housings of a folder-type terminal and a sliding-type terminal, only those selected part(s) among the input devices and the output devices may be installed in the portable terminal 100.

Referring to FIGS. 4 through 6, the portable terminal 100 includes a pivotably installed antenna module 104 and the battery pack 109 which is inserted or ejected in a longitudinal direction of the portable terminal 100, such that an insertion inlet of the battery pack 109 (or ejection outlet, which will be collectively referred to as 'insertion inlet' or 'inlet') is selectively opened or closed by the antenna module 104. When the antenna module 104 closes the insertion inlet of the battery pack 109, the cover member 102 is coupled to the portable terminal 100, thereby covering and protecting the antenna module 104.

As shown in FIGS. 4 through 6, in the portable terminal 100, a front case 101b and a rear case 101a are coupled to each other, and the rear case 101a is open by removal of a portion thereof, more specifically, a part of a lower portion thereof. The removed portion of the rear case 101a exposes a portion of an internal space of the portable terminal 100 to form a receiving recess 111 and provide a battery opening 113 in the inner side of the rear case 101a. The battery opening 113 extends from the receiving recess 111 in the longitudinal direction of the portable terminal 100, and the insertion inlet of the battery pack 109 is positioned at a connecting portion between the receiving recess 111 and the battery opening 113. As previously mentioned, the receiving recess 111 may be positioned at a side end of the rear surface of the portable terminal 100, and in this case, the battery opening 113 extends in the widthwise direction of the portable terminal 100.

The cover member 102 protects the removed portion of the rear case 101a, that is, the receiving recess 111 by covering the receiving recess 111 and forms a predetermined space in the inner side of the cover member 102. The cover member 102, together with the rear case 101a, conceals an internal space of the portable terminal 100 on the rear surface of the portable terminal 100. Concealing the internal space of the portable terminal 100 provides means for not only visually hiding the internal space but also providing a sealing function such as waterproofing.

In the receiving recess 111 is pivotally installed the antenna module 104 which is selectively positioned on the receiving recess 111 by pivoting on the receiving recess 111. The antenna module 104 is positioned on the receiving recess 111 in FIG. 4, and the antenna module 104 leaves the receiving recess 111 in FIGS. 5 and 6. The antenna module 104, when being positioned on the receiving recess 111, closes the inlet of the battery opening 113, such that the battery pack 109 cannot be inserted or ejected. In other words, for insertion or ejection of the battery pack 109, the antenna module 104 has to leave the receiving recess 111 open by pivoting. When the antenna module 104 leaves from the receiving recess 111 open, the battery pack 109 is inserted into the inner side of the rear case 101a in the longitudinal direction of the portable terminal 100. When the antenna module 104 is positioned on the receiving recess 111, the cover member 102 is coupled to the rear surface of the portable terminal 100, thus covering and protecting the antenna module 104.

Figure 7:
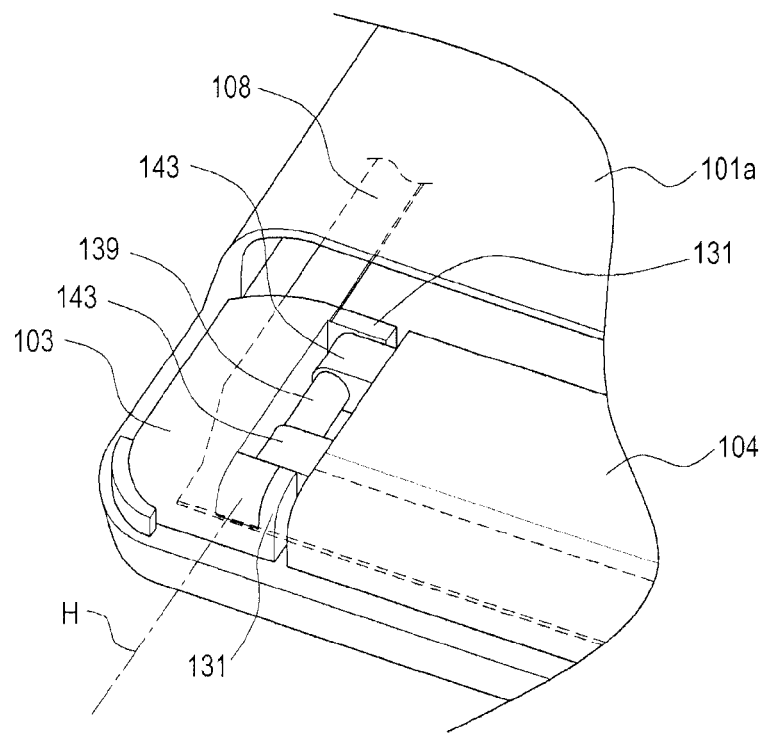
FIGS. 7 and 8 are views for describing a structure where an antenna module of the portable terminal shown in FIG. 3 is installed.
Figure 8:
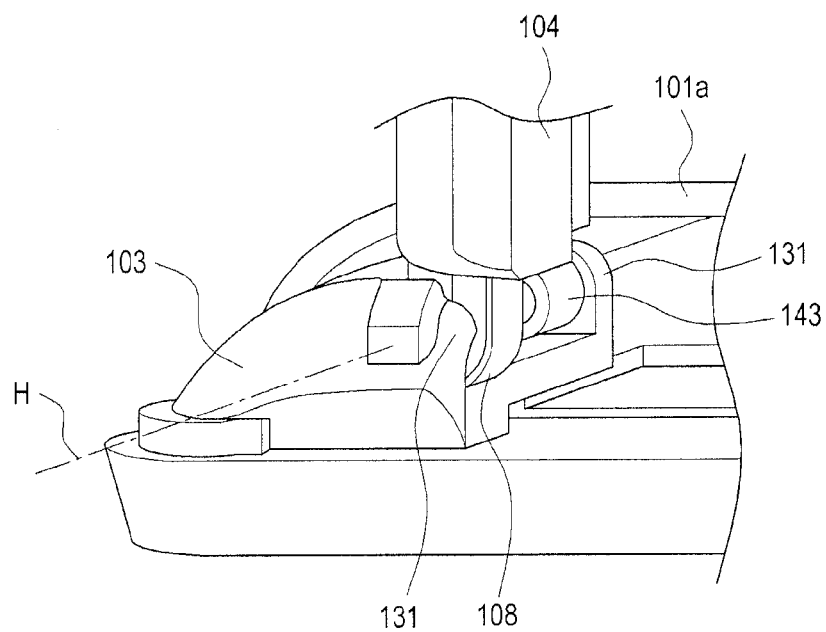

FIGS. 7 and 8 are views for describing a structure where the antenna module 104 is pivotably installed. To pivotably install the antenna module 104, a fixing member 103 is mounted on the receiving recess 111. The fixing member 103 is fixed to a side end of the receiving recess 111 and includes rotation support members 131. The rotation support members 131 are formed at side corner portions of the fixing member 103 and are shown as a pair at spaced positions. Rotation members 143 are formed at side ends of the antenna module 104, and a hinge pin 139 is penetratedly coupled to the rotation support members 131 and the rotation members 143, such that the antenna module 104 is pivotably coupled to the fixing member 104.

The rotation members 143 are preferably positioned between the rotation support members 131, and the hinge pin 139 are installed in parallel with the longitudinal direction of the portable terminal 100 by penetrating the rotation support members 131 and the rotation members 143. Thus, the antenna module 104 pivots around a hinge axis H which extends in parallel with the longitudinal direction of the portable terminal, while being supported by the hinge pin 139. In the antenna module 104 is disposed a radiation member (not shown). To connect the radiation member to a main board of the portable terminal 100, a flexible printed circuit board 108 is wired. The flexible printed circuit board 108 is drawn from the inner side of the antenna module 104 to a portion adjacent to the rotation members 143, passes through the fixing member 103 and is wired to the inner side of the rear case 101a. The antenna module 104, the fixing member 103, and the flexible printed circuit board 108 may be provided as a single module in a pre-assembled state to a finished product assembly line.

Typically, a portable terminal includes a connector for connecting to an external device, for example, a computer to input and output information of the portable terminal by a user or inputting and outputting information from and to an external device by a user or make a fault diagnosis by an engineer. The connector may also be used for connection to a hand-free head set or a charging device.

The portable terminal 100 may dispose a connector 141 for connection with an external device in the antenna module 104. The connector 141 is also connected to the main board of the portable terminal through the flexible printed circuit board 108. Once the cover member 102 is coupled when the antenna module 104 is positioned on the receiving recess 111, the cover member 102 covers the antenna module 104. To enable connection of the connector 141 in this state, the cover member 102 may include a connector opening (121 of FIG. 4). Even when the cover member 102 is coupled to the portable terminal 100, the connector 141 may be exposed through the connector opening 121 and connected with an external device through a cable. Thus, a user or engineer can perform charging information input/output, and fault diagnosis without separating the cover member 102 from the portable terminal 100.

Figure 9:
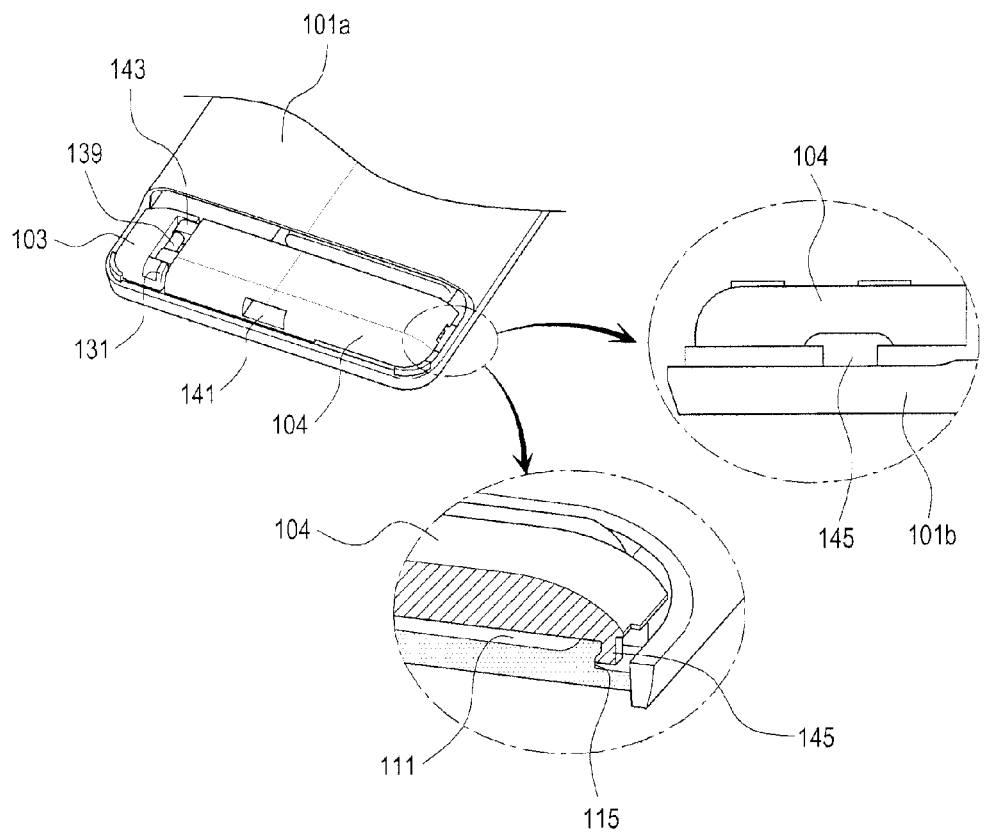
FIGS. 9 and 10 are views showing a structure for binding an antenna module of the portable terminal shown in FIG. 3 onto the portable terminal.

FIG. 9 is a diagram showing a structure for fixing the antenna module 104 which is positioned on the receiving recess 111. Such a structure is intended to prevent movement of the antenna module 104 when the cover member 102 is coupled to the portable terminal 100 while covering the antenna module 104. To fix the antenna module 104 in a state of being positioned on the receiving recess 111, a hook 145 is formed at another end of the antenna module 104, and a hook groove 115 is formed in the receiving recess 111. When the antenna module 104 is positioned on the receiving recess 111, the hook 145 is engaged with the hook groove 115, thus fixing the antenna module 104. The hook 145 may be formed of synthetic resin having elasticity in itself, or may be kept engaged with the hook grove 115 by providing a separate elastic member.

Even when the hook 145 is engaged with the hook groove 115 by its elasticity or elasticity provided by the separate elastic member, upon pivoting of the antenna module 104 by application of user's force, the hook 145 leaves the hook groove 115. This is because the elasticity for engaging the hook 145 with the hook groove 115 is designed to the extent to which the antenna module 104 can be fixed on the receiving recess 111, but the fixing can be released by a user's physical force of pivoting the antenna module 104. The elasticity for engaging the hook 145 with the hook groove 115 may be set differently according to the shape and standard of an actual product.

In operation, when the battery pack 109 is received in the battery opening 113, the antenna module 104 can be stably fixed on the receiving recess 111 and prevent the battery pack 109 from leaving the battery opening 113. Once the cover member 102 is coupled to the portable terminal 100 in the state shown in FIG. 9, the battery opening 113, the battery pack 109, and the antenna module 104 are hidden from outside view. Moreover, the connector 141 is exposed to outside through the connector opening 121 at which a separate cap is installed to prevent the connector 141 from being contaminated by foreign substances.

Figure 10:
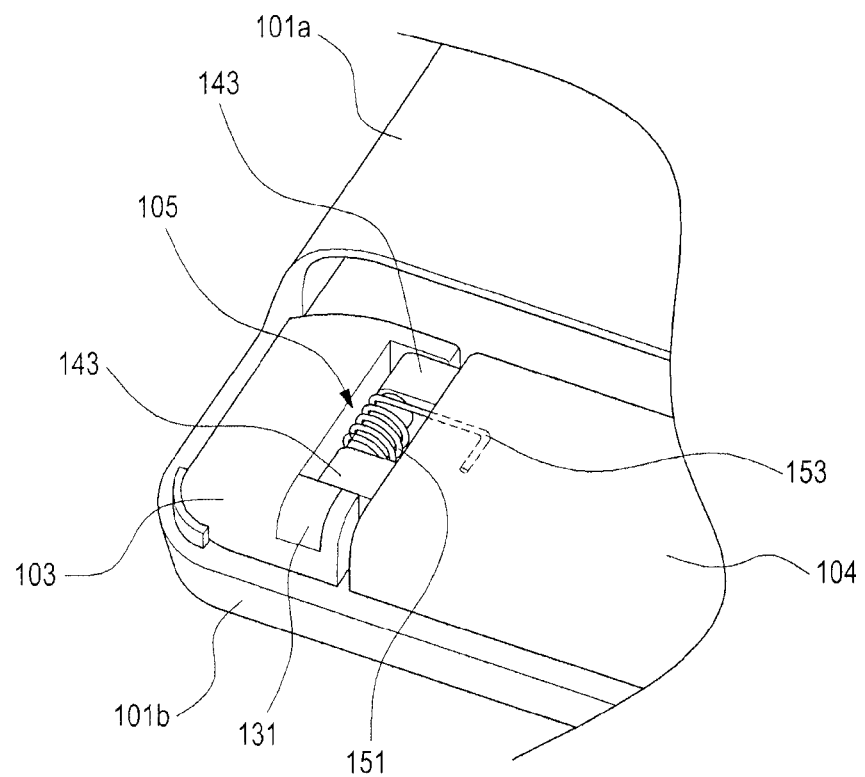

FIG. 10 is a diagram showing another embodiment for stably fixing the antenna module 104 on the receiving recess 111. The structure shown in FIG. 10 uses an elastic member 105 to stably fix the antenna module 104 on the receiving recess 111. The elastic member 105 provides an elastic force working in a direction urging the antenna module 104 to closely contact the bottom surface of the receiving recess 111. The elastic member 105 is a torsion spring including a coil portion 151 and a pair of free ends, such that the coil portion 151 is wound around the outer circumferential surface of the hinge pin 139, where one of the free ends is supported by the fixing member 103 and the other end 153 is supported by the antenna module 104. However, the free end of the elastic member 105 supported by the fixing member 103 may be fixed to any portion other than the antenna module 104.

The elastic member 105 may also provide an elastic force working in a direction urging the antenna module 104 from leaving the receiving recess 111, such that the insertion path of the battery pack 109 can be maintained open during insertion or ejection of the battery pack 109, thus enhance user convenience. In this case, however, when the cover member 102 is coupled to the portable terminal 100, the antenna module 104 closely contacts to and is fixed on the inner surface of the cover member 102. On the other hand, when the elastic member 105 is installed to provide an elastic force working in a direction urging the antenna module 104 from leaving the receiving recess 111, the antenna module 104 may be maintained fixed on the receiving recess 111 by using the hook 145 and the hook groove 115 shown in FIG. 9.

Figure 11:
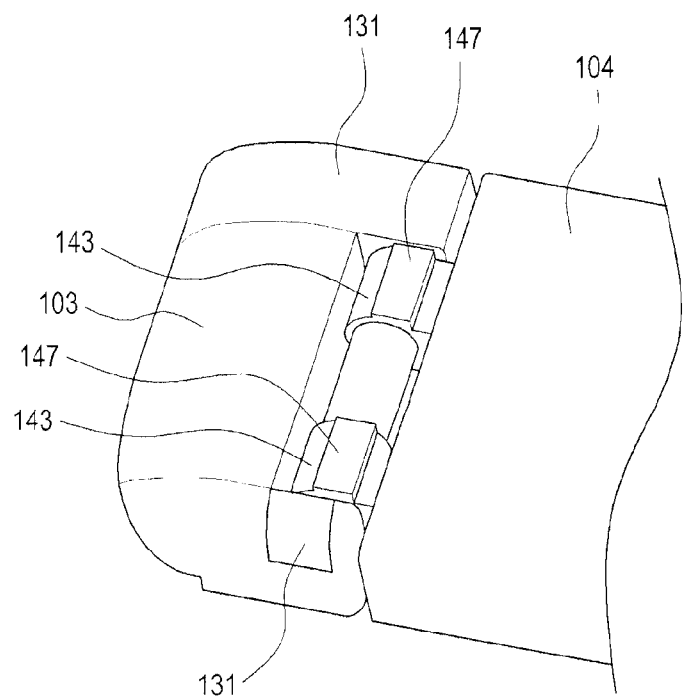
FIGS. 11 and 12 are views showing a structure for limiting a range of pivoting of an antenna module of the portable terminal shown in FIG. 3.
Figure 12:
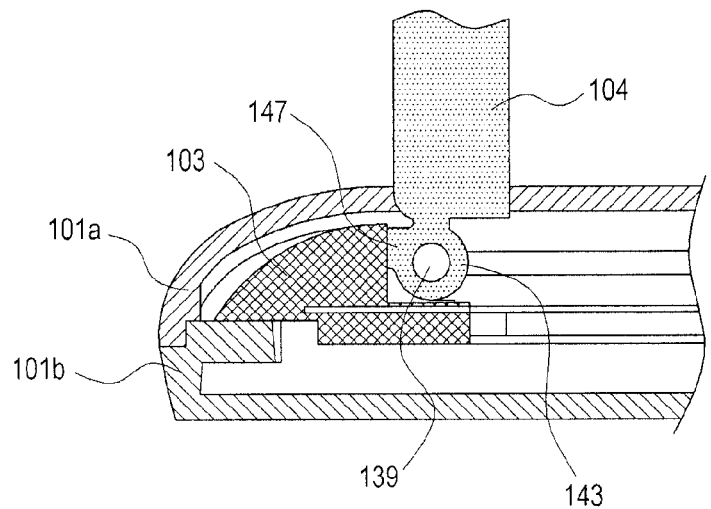

FIGS. 11 and 12 show a structure for limiting a pivoting angle range of the antenna module 104. The pivoting angle range of the antenna module 104 means a range of an angle by which the antenna module 104 can pivot from the position being on the receiving recess 111. The antenna module 104 and the fixing member 103 may interfere with each other, but a separate stopping member may be installed to provide a more stable structure. As shown in FIGS. 11 and 12, on the antenna module 104, more specifically, on the outer circumferential surfaces of the rotation members 143 are formed stopping members 147. The stopping members 147 protrude from the outer circumferential surfaces of the rotation members 143 and their top portions are plane as show in FIG. 11. Once the antenna module 104 pivots from the receiving recess 111 by a predetermined angle, the plane portions of the stopping members 147 are engaged with a plane portion of the fixing member 103 by surface-contacting. In this state, in FIG. 12, the top portions of the stopping members 147 are farther away from the hinge pin 139 than bottom portions of the stopping members 147. Thus, when the top portions of the stopping members 147 contact the fixing member 103, the antenna module 104 cannot pivot any further away from the receiving recess 111.

It has been described that the elastic member 105 may be installed to provide an elastic force working in a direction urging the antenna module 104 to leave the receiving recess 111, and in this installation structure of the elastic member 105, the stopping members 147 may be useful. For example, the stopping members 147 may be used to limit the pivoting range of the antenna module 104 and by being formed of a buffering material, may alleviate shock generated at the moment when the antenna module 104, which pivots by the elastic force of the elastic member 105, stops.

FIGS. 13 through 15 sequentially show ejection of a battery pack from a portable terminal 200 according to a second embodiment of the present invention. The portable terminal 200 according to the second embodiment is similar to the portable terminal 100 according to the first embodiment, except for a structure where an antenna module is pivotably coupled on a receiving recess. Thus, when the current embodiment is described in detail, components that can be easily understood by the first embodiment will be given the same reference numerals but their detailed description thereof will omitted to avoid redundancy.

Figure 16:
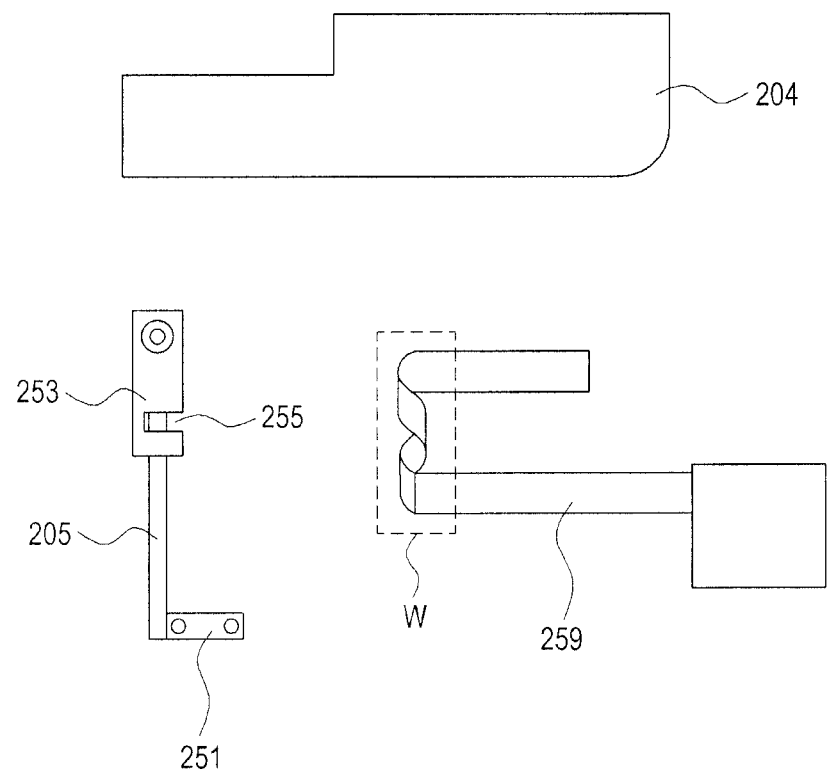
FIG. 16 is a view for describing a structure for coupling an antenna module of the portable terminal shown in FIG. 13 to the portable terminal.
Figure 17:
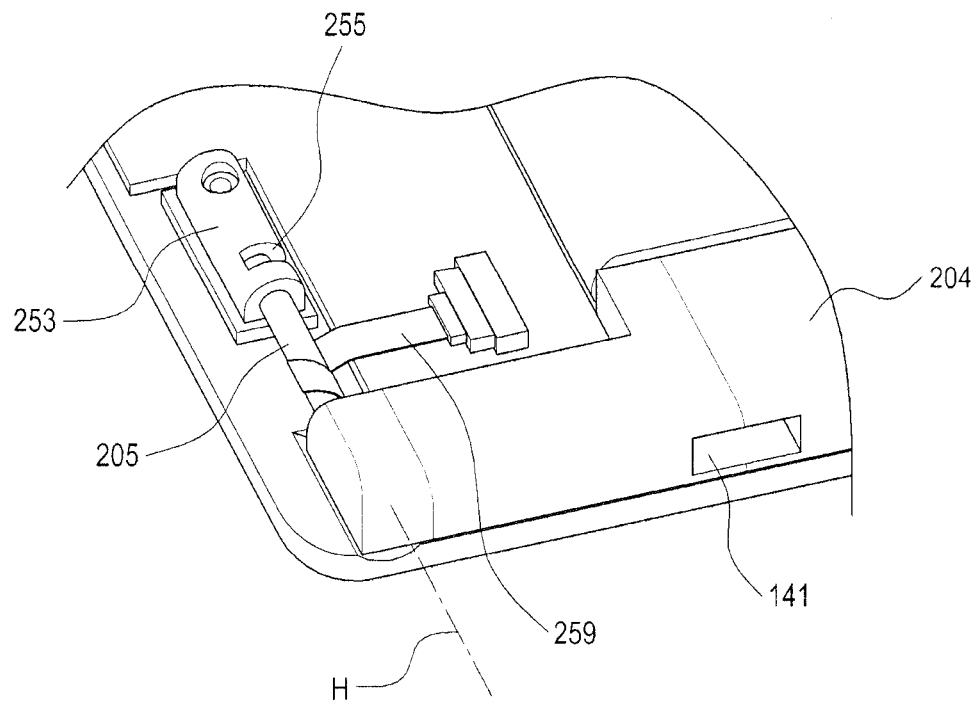
FIGS. 17 and 18 are views showing a structure for limiting a range of pivoting of an antenna module of the portable terminal shown in FIG. 13.
Figure 18:
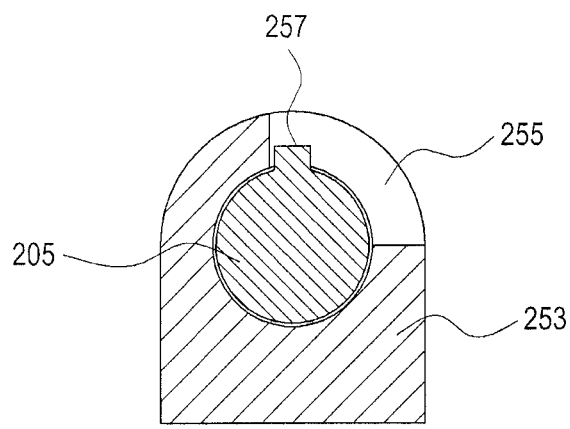

Referring to FIGS. 16 through 18, to pivotably couple an antenna module 204 of the portable terminal 200 on the receiving recess 111, the portable terminal 200 according to the second embodiment includes a fixing member 253 and a hinge pin 205. The fixing member 253 is mounted and fixed in adjacent to a side end of the receiving recess 111 in the inner side of the rear case 101a, and a portion of the hinge pin 205 is rotatably inserted into the fixing member 253. The hinge pin 205 is arranged in parallel with a longitudinal direction of the portable terminal 200 and rotates while being bound to the fixing member 253, thus providing a hinge axis H which serves as a pivoting center of the antenna module 204. Herein, it should be obvious to those artisians that the hinge axis H also extends along the longitudinal direction of the portable terminal 200.

The antenna module 204 is coupled such that its side end is fixed to the hinge pin 205, and to stably fix the antenna module 204 and the hinge pin 205 and stably maintain pivoting of the antenna module 204, the portable terminal 200 may further include a fixing piece 251. The fixing piece 251 extends perpendicularly to the hinge axis H from an end portion of the hinge pin 205.

On a surface of a side end of the antenna module 204 may be formed a groove capable of receiving another portion of the hinge pin 205 and the fixing piece 251. The hinge pin 205 and the fixing piece 251 are received in the groove formed in the antenna module 204, and the fixing piece 253 is fixed to the antenna module 204 by using a screw or the like.

In the portable terminal 200 according to the second embodiment, as in the portable terminal 100 of the first embodiment, the radiation member (not shown) and the connector 141 are installed in the antenna module 204. A flexible printed circuit board 259 for connecting the radiation member and the connector 141 with the main board of the portable terminal 200 is drawn from the antenna module 204, is wound around the outer circumferential surface of the hinge pin 205 at least once (as indicated by W in FIG. 16), and then wired to the inner side of the rear case 101a.

To limit the pivoting angle range of the antenna module 204, the portable terminal 200 may include a guide groove 255 formed in the fixing member 253 and a stopping protrusion 257 formed on the outer circumferential surface of the hinge pin 205. The guide groove 255 extends around the hinge axis H in a circumferential direction by a predetermined angle range. When the hinge pin 205 is installed in the fixing member 253, the stopping protrusion 257 is positioned in the guide groove 255 such that the stopping protrusion 257 moves along the guide groove 255 as the hinge pin 205 rotates. Since the guide groove 255 extends by only the predetermined angle range, the stopping protrusion 257 is interfered by an end portion wall of the guide groove 255, thus limiting the rotation range of the hinge pin 205. If an extending angle of the guide groove 255 is adjusted to limit a range of an angle by which a side surface of the stopping protrusion 257, which is interfered by any one of end portion walls of the guide groove 255, pivots around the hinge axis H to 90°. Hence, the rotation angle range of the hinge pin 205, more specifically, the pivoting angle range of the antenna module 204 can be limited to 90°.

While the fixing member 253 is shown as entirely covering the outer circumferential surface of the hinge pin 205 in FIG. 18, a part of a bottom portion of the fixing member 253 may be open to allow the stopping protrusion 257 to move to the guide groove 255 during assembly. The opened part of the fixing member 253 may be closed by assembling the fixing member 253 onto the portable terminal 200 as shown in FIG. 17.

FIGS. 19 through 24 illustrate a sequential ejection process of the battery pack 109 from a portable terminal 300 according to a third embodiment of the present invention. In the portable terminal 300 according to the third embodiment, a hinge axis H (shown in FIG. 25) of an antenna module 304 extends in perpendicular to a longitudinal direction of the portable terminal 300, that is, in parallel with a widthwise direction of the portable terminal 300. Note that the same components that can be easily understood by a previous embodiment will be given the same reference numerals and their description thereof will be omitted to avoid redundancy.

To pivotably couple the antenna module 304 onto the receiving recess 111 of the portable terminal 300, the portable terminal 300 includes a pivot member 303 and the antenna module 304 includes guide members 351.

Figure 20:
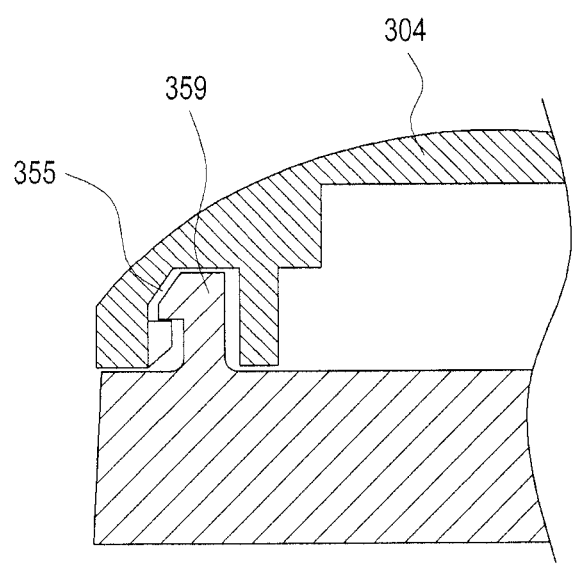
FIG. 20 is a view for describing a state where an antenna module of the portable terminal shown in FIG. 19 is bound onto the portable terminal.
Figure 25:
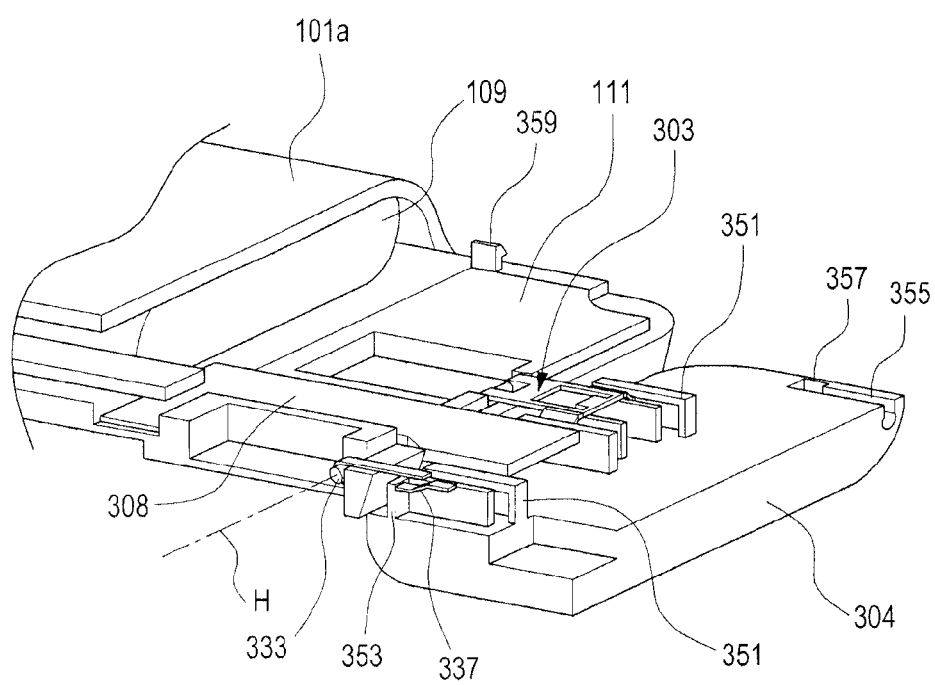
FIG. 25 is a perspective view partially taken from a state where an antenna module of the portable terminal shown in FIG. 19 opens a battery opening.
Figure 26:
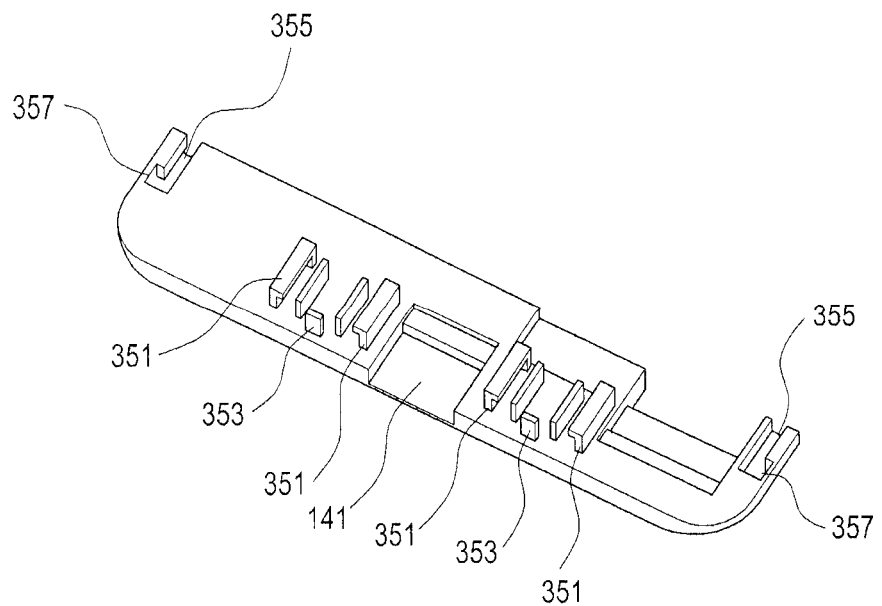
FIG. 26 is a perspective view showing an antenna module of the portable terminal shown in FIG. 19.

Referring to FIG. 26, at both sides of a surface of the antenna module 304 are formed engaging grooves 355 extending in the longitudinal direction of the portable terminal 300, respectively. Each engaging groove 355 includes at an end portion thereof a releasing groove 357 formed to have a larger width than the other portions. Further, as shown in FIGS. 20 and 25, hooks 359 are formed on the receiving recess 111, such that when the antenna module 304 is positioned on the receiving recess 111, the hooks 359 are engaged with the engaging grooves 355 or positioned on the releasing grooves 357. When the hooks 359 are engaged with the engaging grooves 355, the antenna module 304 is kept fixed such that the antenna module 304 cannot pivot on the receiving recess 111, but the antenna module 304 can slide in the extending direction of the engaging grooves 355. Once the antenna module 304 slides, the hooks 359 may be positioned on the releasing groves 357 and in this state, the antenna module 304 can pivot on the portable terminal 300. That is, the hooks 359 are engaged with the engaging grooves 355 to prevent the antenna module 304 from pivoting, or are positioned on the releasing grooves 357 to allow the antenna module 304 to pivot.

On a surface of the antenna module 304, more specifically between the engaging grooves 355 are formed the guide members 351, each of which has a closed end and an open end. The guide members 351 face each other in pairs, and two pairs of the guide members 351 are disposed in positions spaced apart from each other. Between each pair of the guide members 351, a first stopping member 353 protrudes in a position adjacent to the open ends of the guide members 351. In a mid portion between the engaging grooves 355 is disposed the connector 141.

Figure 27:
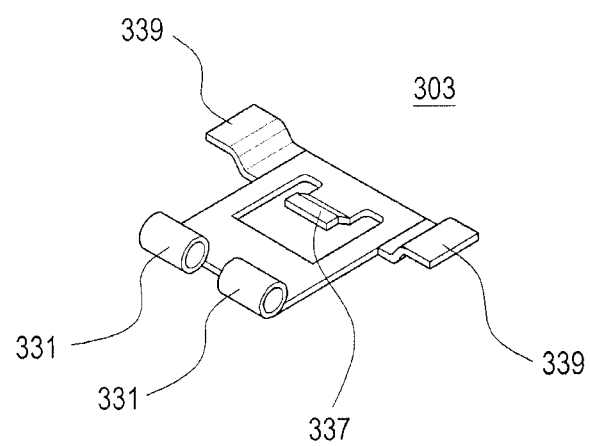
FIG. 27 is a perspective view showing a pivot member of the portable terminal shown in FIG. 19.

Referring to FIG. 27, the pivot member 303 is manufactured by processing a metal plate. An end of the pivot member 303 is rolled up to form rotation portions 331 providing a rotation center, and both side ends 339 of another end of the pivot member 303 are covered with the guide members 351, thus being slidably coupled to the guide members 351. A second stopping member 337 protruding to a surface of the pivot member 303 is formed between the both side ends 339 of the other end of the pivot member 303. Once the antenna module 304 is coupled with the pivot member 303, the guide members 351 are coupled to cover the both side ends 339 of the pivot member 303, thus guiding a sliding movement of the antenna module 304.

The pivot member 303 is inserted through an open end of the guide member 351, then it is assembled to be covered with the guide members 351. When the pivot member 303 is coupled to the guide members 351, the second stopping member 337 passes above a top portion of the first stopping member 353 to a position between the closed ends and the open ends of the guide members 351. The pivot member 303 has elasticity as it is manufactured of a metal material. As such, the second stopping member 337 does not experience a permanent deformation even when it contacts the first stopping member 353 to a position between the closed ends and the open ends of the guide members 351 during the assembly process.

Once the antenna module 304 slides with respect to the pivot member 303, the pivot member 303 moves close to an end or another end of each guide member 351. In this state, the pivot member 303 is interfered by the closed end of the guide member 351 or the first stopping member 353 positioned near another end of the guide member 351 is interfered by the second stopping member 337, thereby limiting the sliding range of the antenna module 304.

The pivot member 303 is pivotably coupled to the receiving recess 111 by a hinge pin (333 of FIG. 25) installed on the receiving recess 111 to penetrate through the rotation portions 331, and the antenna module 304 is pivotably coupled to the receiving recess 111 through the pivot member 303. On the receiving recess 111, the antenna module 304 moves close to or away from the hinge axis H by being guided by the pivot member 303.

Similar to the previous embodiments, the antenna module 304 includes a radiation member and the connector 141. As shown in FIG. 25, to connect the radiation member and the connector 141 to the main board of the portable terminal 300, a flexible printed circuit board 308 drawn from the antenna module 304 passes by the receiving 10 recess 111 and is wired to the inner side of the rear case 101a.

Referring to FIGS. 19 and 20, when the antenna module 304 is positioned on the receiving recess 111, the hooks 359 are engaged with the engaging grooves 355. Thus, the antenna module 304 is stably positioned within the receiving recess 111 in a state of being capable of sliding, but incapable of pivoting.

Figure 22:
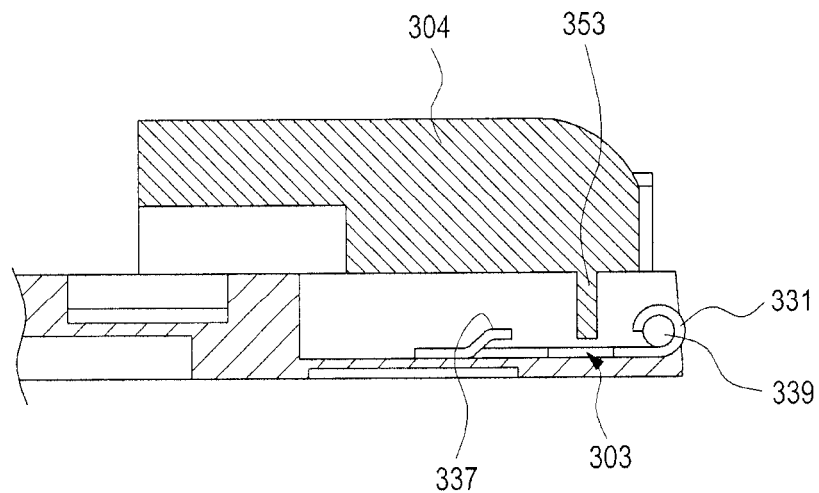
FIGS. 22 and 23 are views showing states before and after an antenna module of the portable terminal shown in FIG. 19 moves away from a hinge shaft.
Figure 23:
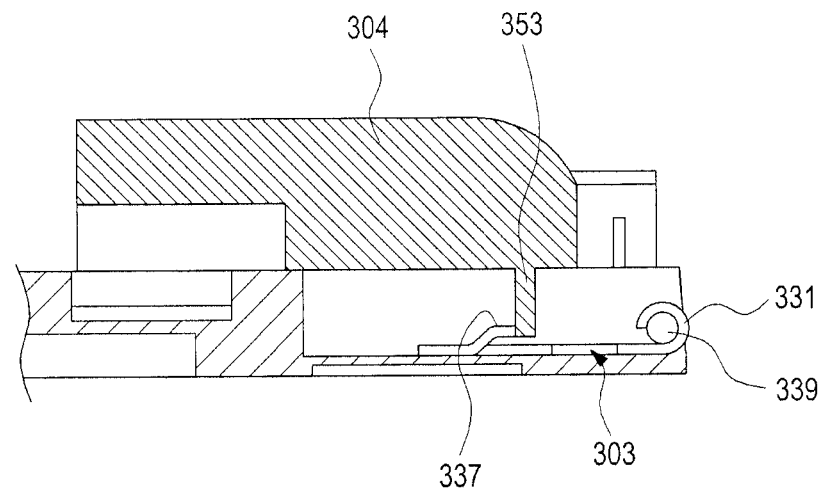

Referring to FIG. 21, when the antenna module 304 moves away from the hinge axis H by being guided by the pivot member 303s, the hooks 359 are positioned on the releasing grooves 357. Thus, the antenna module 304 turns to the pivotable state. FIGS. 22 and 23 show states before and after sliding of the antenna module 304. As can be seen from FIGS. 22 and 23, when the antenna module 304 is in the pivotable position, the first stopping member 353 and the second stopping member 337 interfere with each other.

In this state, by forming a groove between each pair of the guide members 351 to allow the second stopping member 337 to be partially engaged with the groove, the stop position of the sliding of the antenna module 304 can be stably maintained to some extent.

For example, while the top portion of the second stopping member 337 is plane in FIGS. 22 and 23, the second stopping member 337 may be manufactured to have some protrusion in a curved shape on the top portion thereof To correspond to the protrusion, a stopping groove may be formed between each pair of the guide members 351 to allow the protrusion of the second stopping member 337 to be engaged with the stopping groove. By setting a position of the stopping groove such that the stopping groove is engaged with the protrusion of the second stopping member 337 when the antenna module 304 is stopped in the position shown in FIG. 19 or FIG. 21, the user can easily stop the antenna module 304 in a predetermined position to prevent the antenna module 304 from sliding.

As can be anticipated from the foregoing description, in the portable terminal according to the present invention, the antenna module provided at an end portion of the portable terminal is configured to be pivotable, thus allowing the battery pack to be inserted or ejected in the longitudinal direction or the widthwise direction of the portable terminal. This structure is made possible because the battery opening extends in the longitudinal direction or the widthwise direction of the portable terminal, but an inlet thereof is disposed to be opened or closed by the antenna module. Hence, the exposure of boundary lines between parts can be minimized on the exterior of the portable terminal in spite of coupling of the separate cover member to the portable terminal.

While the present invention has been shown and described with reference to embodiments thereof, it will be understood by those skilled in the art that various changes in form and details may be made therein without departing from the spirit and scope of the invention as defined by the appended claims. For example, the cover member may be integrated into the antenna module as a one-piece with the antenna module to complete a portion of the rear case of the portable terminal. However, it should be noted that in such a change, the antenna module is implemented to be pivotable on the portable terminal.

What is claimed is:

1. A portable terminal comprising:
   a substantially flat casing having a corresponding minimal height along a height-axis;
   a battery opening formed on an inside surface of the portable terminal, the battery opening extending in a longitudinal direction or a widthwise direction perpendicular to the height-axis;
   a battery pack disposed in the battery opening in the longitudinal direction or the widthwise direction of the portable terminal, the battery opening configured to receive the battery pack by insertion along an insertion axis perpendicular to the height axis;
   an antenna module pivotably coupled to a rear surface of the portable terminal and pivotable along an axis that is parallel to the longitudinal direction of the portable terminal from an open to a closed position to selectively open or close the battery opening via a pivotal movement;
   a receiving recess formed at an end portion or a side end of the rear surface of the portable terminal;
   a fixing member mounted and fixed at a side end of the receiving recess;
   a rotation support member formed on the fixing member, and a rotation member formed at a side end of the antenna module;
   a stopping member protruding from an outer circumferential surface of the rotation member, wherein upon pivoting of the antenna module, the stopping member interferes with the fixing member to limit a pivot angle range of the antenna module;
   a cover member removably coupled to the casing at the rear surface of the portable terminal and covering the antenna module when the antenna is pivoted to a closed position, the cover member covering a receiving recess formed at an end portion of the rear surface of the portable terminal, wherein the antenna module opens or closes the battery opening by pivoting around a hinge axis which extends in parallel with the longitudinal direction of the portable terminal; and
   a hinge pin installed in the fixing member along the hinge axis to pivotably couple the antenna module to the fixing member, wherein the hinge pin is fixed to the rotation support member by penetrating through the rotation member.

2. The portable terminal of claim 1, wherein the antenna module opens or closes the battery opening by being selectively positioned on the receiving recess through pivoting on the rear surface of the portable terminal.

3. The portable terminal of claim 2, further comprising a cover member removably coupled to the casing at the rear surface of the portable terminal and covering the antenna module positioned on the receiving recess.

4. The portable terminal of claim 1, further comprising a rear cover for covering the antenna module and providing a rear recess at an end portion or a side end of the rear surface of the portable terminal, wherein the antenna module disposed in the rear recess to selectively open or close the battery opening via a pivotal movement.

5. The portable terminal of claim 1, wherein the antenna module comprises a connector in communication with an external device through a cable.

6. The portable terminal of claim 5, further comprising:
   a cover member having a connector opening in line with the connector and removably coupled to the rear surface of the portable terminal to cover the antenna module.

7. The portable terminal of claim 1, further comprising a rear case installed at the rear surface of the portable terminal, wherein the battery opening extends from a lower end of the rear case along an inner side of the rear case in a longitudinal direction of the portable terminal.

8. The portable terminal of claim 7, wherein a lower end of the rear case provides a receiving recess to accommodate the antenna module to be rotated to open or close the battery opening.

9. The portable terminal of claim 8, further comprising a cover member removably coupled to the rear surface of the portable terminal to cover the antenna module disposed in the receiving recess.

10. The portable terminal of claim 1, wherein rotation support members as a pair are positioned spaced apart from each other, and the rotation member is positioned between the rotation support members.

11. The portable terminal of claim 1, further comprising:
    a hook formed at another side end of the antenna module; and
    a hook groove formed on the receiving recess,
    wherein the hook is engaged with the hook groove to keep the antenna module in the receiving recess.

12. The portable terminal of claim 1, further comprising an elastic member providing an elastic force working in a direction urging the antenna module to be positioned in the receiving recess, wherein the elastic member comprises a coil portion wound around an outer circumferential surface of the hinge pin and a pair of free ends extending from the coil portion, one of the free ends being supported by the antenna module and the other end being supported by the fixing member.

13. The portable terminal of claim 1, further comprising:
a fixing member mounted and fixed in adjacent to a side end of the receiving recess; and
a hinge pin, a portion of which is inserted into the fixing member along the hinge axis, such that the hinge pin rotates around the hinge axis,
wherein the side end of the antenna module is coupled to another portion of the hinge pin.

14. The portable terminal of claim 13, further comprising a fixing piece extending in perpendicular to the hinge axis from an end portion of the hinge pin, wherein the antenna module is coupled to the fixing piece.

15. The portable terminal of claim 13, further comprising a flexible printed circuit board extending from the antenna module, wherein the flexible printed circuit board is wound around an outer circumferential surface of the hinge pin at least once and then wired to an inner side of the portable terminal.

16. The portable terminal of claim 13, further comprising:
a guide groove which is formed on the fixing member and extends around the hinge axis in a circumferential direction; and
a stopping protrusion protruding from an outer circumferential surface of another end portion of the hinge pin to be received in the guide groove,
wherein upon a rotation of the hinge pin, the stopping protrusion moves along the guide groove and is interfered by an end portion wall of the guide groove, thereby limiting a rotation range of the hinge pin.

17. The portable terminal of claim 1, wherein the antenna module provided in a receiving recess formed at the rear surface of the portable terminal opens or closes the battery opening by pivoting around a hinge axis which extends in perpendicular the longitudinal direction of the portable terminal.

18. The portable terminal of claim 17, wherein the antenna module opens or closes the battery opening by being selectively positioned on the receiving recess.

19. The portable terminal of claim 18, further comprising a pivot member pivotably coupled to the receiving recess to pivot around the hinge axis, wherein the antenna module is coupled to the pivot member.

20. The portable terminal of claim 19, wherein pivot members as a pair are coupled to the receiving recess.

21. The portable terminal of claim 19, wherein the antenna module is coupled to the pivot member to slide close to or away from the hinge axis.

22. The portable terminal of claim 21, further comprising:
a hook formed on the receiving recess;
an engaging groove formed on the antenna module; and
a releasing groove provided at an end portion of the engaging groove,
wherein when the antenna module is received in the receiving recess and is positioned near the hinge axis, the hook is engaged with the engaging groove to restrict pivoting of the antenna module, and when the antenna module slides away from the hinge axis, the hook is positioned on the releasing groove to allow the antenna module to freely pivot.

23. The portable terminal of claim 22, further comprising:
guide members which are formed on the antenna module and cover both side ends of the pivot member to allow the both side ends to slide;
a first stopping member formed between the guide members; and
a second stopping member formed in the pivot member,
wherein as the antenna module slides, the both side ends of the pivot member are interfered by end portions of the guide members and the first stopping member is interfered by the second stopping member, thereby limiting a sliding range of the antenna module.

24. The portable terminal of claim 21, further comprising:
guide members formed on the antenna module and cover both side ends of the pivot member to allow the both side ends to slide;
a first stopping member formed between the guide members; and
a second stopping member formed in the pivot member,
wherein as the antenna module slides, the both side ends of the pivot member are interfered by end portions of the guide members and the first stopping member is interfered by the second stopping member, thereby limiting a sliding range of the antenna module.

* * * * *